United States Patent [19]
Hanson

[11] Patent Number: 5,729,652
[45] Date of Patent: Mar. 17, 1998

[54] SYSTEM FOR CONTROLLING THE SPEED OF A MOTOR DRIVEN BY AN UNREGULATED VOLTAGE

[75] Inventor: Kirk D. Hanson, San Diego, Calif.

[73] Assignee: Iomega Corporation, Roy, Utah

[21] Appl. No.: 780,401

[22] Filed: Jan. 8, 1997

Related U.S. Application Data

[62] Division of Ser. No. 520,366, Aug. 28, 1995.

[51] Int. Cl.$^6$ .................. G11B 19/28; H02P 5/17
[52] U.S. Cl. .............. 388/811; 369/239; 363/46; 318/268; 318/432
[58] Field of Search .................. 388/803, 804, 388/809, 811, 815, 829; 318/268, 432, 433, 448, 599; 363/39, 40, 41, 44, 45, 46; 369/189, 239, 264, 266, 267; 360/73.01

[56] References Cited

U.S. PATENT DOCUMENTS

| | | | |
|---|---|---|---|
| 4,358,730 | 11/1982 | Beifus | 323/322 |
| 4,622,500 | 11/1986 | Budelman, Jr. | 318/341 |
| 5,250,890 | 10/1993 | Tanamachi et al. | 318/811 |
| 5,298,841 | 3/1994 | Katayama et al. | 318/268 |
| 5,331,261 | 7/1994 | Brown et al. | 318/376 |
| 5,350,989 | 9/1994 | Wedeen | 318/632 |
| 5,481,451 | 1/1996 | Kuwahara | 363/37 |

*Primary Examiner*—Bentsu Ro
*Attorney, Agent, or Firm*—Woodcock Washburn Kurtz Mackiewicz & Norris LLP

[57] ABSTRACT

A method for controlling the speed of a motor driven by an unregulated voltage supply is disclosed. The disclosed method comprises obtaining a ripple signal ($V_R$) representative of the ripple component of the supply voltage, and modulating the motor current ($I_M$) in response to at least the ripple signal to maintain the speed of the motor at a prescribed target speed.

11 Claims, 3 Drawing Sheets

SYSTEM FOR CONTROLLING THE SPEED OF A MOTOR DRIVEN BY AN UNREGULATED VOLTAGE

This is a division of application Ser. No. 08/520,366, filed Aug. 28, 1995, the disclosure of which is herein incorporated by reference.

FIELD OF THE INVENTION

The present invention relates generally to methods and apparatus for controlling the speed of a motor. More particularly, the invention relates to an inexpensive system that drives a DC capstan motor with an unregulated voltage supply and controls the motor speed by employing a simple yet elegant supply ripple feedback into the servo control loop without additional microcontroller intervention or sophistication.

BACKGROUND OF THE INVENTION

Prior art systems for driving a DC motor of the type employed in a computer tape or disk drive typically employ a relatively expensive regulated DC voltage supply. For example, in the system depicted in FIG. 1, a voltage regulator 10 regulates the unregulated DC supply voltage $V_{IN}$ and provides to a motor 12 a regulated supply of DC voltage $V_{REG}$ and a motor driving current $I_M$, wherein the latter is a function of the voltage across the motor input and output supply terminals and the motor impedance. The motor impedance is a function of the resistance of the motor windings and the speed of the motor.

In the system depicted in FIG. 1, a single Hall effect sensor 14 provides position feedback signals to a microcontroller circuit 16 for use in determining the motor speed. The microcontroller 16 provides to a pulse width modulator (PWM) circuit 18 a signal indicative of a target voltage to be applied to the motor. The microcontroller 16 controls the voltage across the motor, and thus the motor current $I_M$, by generating a signal (called TARGET in the drawings) that is pulse width modulated by PWM circuit 28 and employed to control the actuation of a switch unit 20. A current sensing device 22 provides a signal $V(I_M)$ indicative of the motor drive current $I_M$, and this signal is fed back to the PWM circuit 16 and employed by the microcontroller 16 and PWM circuit 18 to limit the motor current to a predetermined maximum level.

The PWM signal controlling the switching device and thus modulating the motor current $I_M$ is generated by the PWM circuit 18 under the assumption that the motor supply voltage is well regulated and that a given duty cycle of the PWM signal will result in a certain motor current (note that motor speed increases as motor current increases, and the number of Hall transition signals per unit time increases as the motor speed increases). The microcontroller 16 and PWM circuit 18 deal with any low frequency variation of the load, such as, e.g., a variation due to the winding of a cartridge tape (e.g., a DC2000 tape cartridge), which might otherwise cause the motor speed to vary unacceptably, by periodically monitoring the motor speed and adjusting the PWM signal to increase or decrease the current $I_M$ as needed. In the exemplary system of FIG. 1, the microcontroller 16 checks the motor speed approximately every 10 ms, or at a rate of about 100 Hz.

In the highly competitive computer peripherals industry, it is extremely important to produce products at a low cost. Therefore, it would be advantageous to reduce the cost of a motor control system for use with a tape or disk drive by eliminating the need for a regulated DC voltage supply. However, it is important that the recording frequency (and thus the motor speed) of tape/disk drives be well controlled. If one were to simply eliminate the voltage regulator from the system of FIG. 1, a ripple in the supply voltage, typically having a frequency of about 100–120 Hz and an amplitude of several volts (peak-peak), would cause an unacceptable motor speed variation. This variation could be avoided by increasing the speed and complexity of the controller, particularly by increasing the speed of the main servo loop to about twice the expected bandwidth of the ripple component of the supply voltage, but this would increase the cost of the controller and thus nothing would be gained from eliminating the voltage regulator.

SUMMARY OF THE INVENTION

Accordingly, an object of the present invention is to provide a low cost motor control circuit particularly suited for use in connection with a computer tape or disk drive. A more specific object of the invention is to provide a mechanism for obviating the need for a high cost/high performance controller in a motor control circuit that employs an unregulated power supply. The present invention achieves these goals by employing the ripple component of the unregulated supply voltage in a nested loop within the main servo control loop to make high speed adjustments to the signal modulating the motor current $I_M$.

In a presently preferred embodiment of the invention, the inventive method comprises the steps of obtaining a ripple signal $(V_R)$ representative of the ripple component of the supply voltage, and modulating the motor current $(I_M)$ in response to at least the ripple signal to maintain the speed of the motor at a prescribed target speed. The presently preferred embodiment described herein further comprises the step of providing a first modulating signal $(PWM_1)$ for modulating the motor current to maintain the target speed. The step of modulating the motor current comprises employing $PWM_1$ to obtain a second modulating signal $(PWM_2)$ for use in modulating the motor current. In this embodiment, the ripple voltage has a predetermined, or predeterminable, bandwidth (i.e., the bandwidth can be measured or calculated), and the second modulating signal $PWM_2$ is adjusted at a frequency greater than the expected maximum frequency of the ripple voltage.

The first and second modulating signals are preferably pulse width modulated digital signals. The step of modulating the motor current preferably comprises converting the first modulating signal $PWM_1$ into a reference voltage and comparing the reference voltage to a sum of the ripple voltage and a voltage $(V(I_M))$ representative of the motor current. In the preferred embodiment, $PWM_2$ is a binary signal which assumes a first level (e.g., high) when the reference voltage is greater than the sum and a second level (e.g., low) when the reference voltage is less than the sum.

According to another aspect of the present invention, a method is provided for controlling the speed of a motor of a tape or disk drive, where the motor is driven by an unregulated voltage supply. The method comprises the steps of determining a target motor speed and modulating the motor current to maintain the target speed, wherein, in a main servo loop performed at a first frequency, the motor speed is checked and the motor current is adjusted if necessary. In addition, the motor current and ripple voltage are measured and the modulation of the motor current is adjusted to maintain the target motor speed with greater accuracy. According to the invention, the latter steps are performed in a nested loop at a second frequency greater than the frequency of the main servo loop. The second frequency may be specified to be greater than approximately 200 Hz, at least 10 times larger than the first frequency, or at least twice the expected bandwidth of the ripple voltage.

Another important feature of the invention is that the cost of performing the nested loop is less than the cost of increasing the speed of the main servo loop to account for the ripple voltage and maintain the target speed.

Other features of the invention are disclosed below.

DETAILED DESCRIPTION OF PREFERRED EMBODIMENTS

Figure 1:
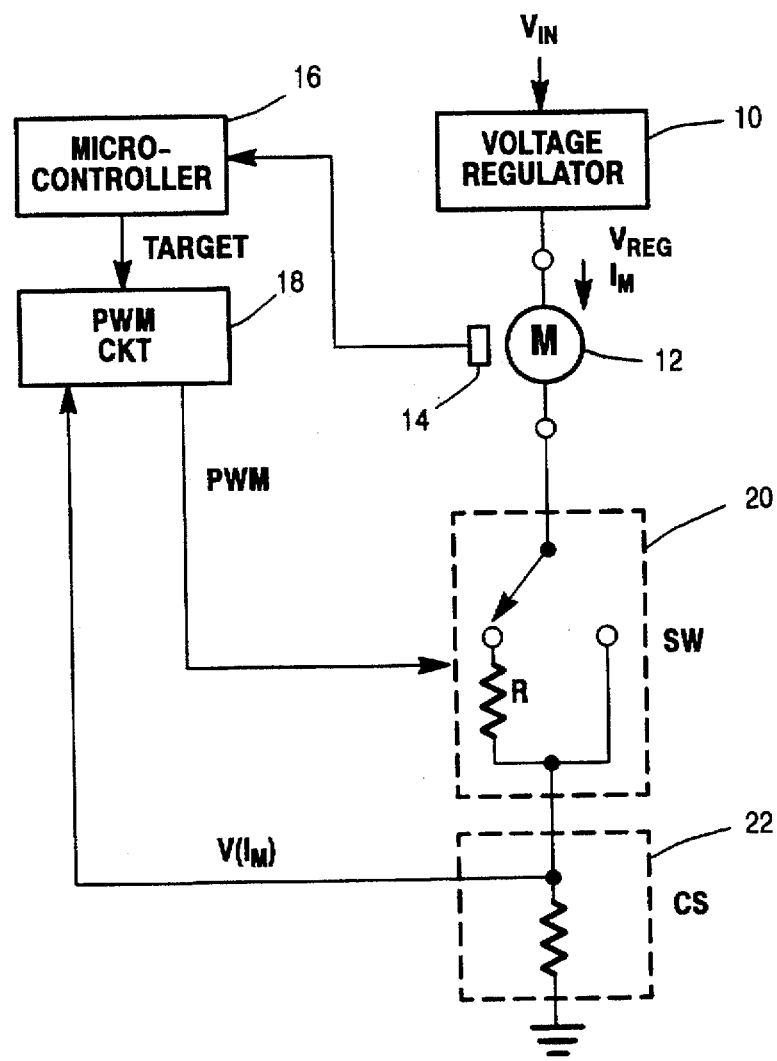
FIG. 1 schematically depicts a prior art motor control system.
Figure 2:
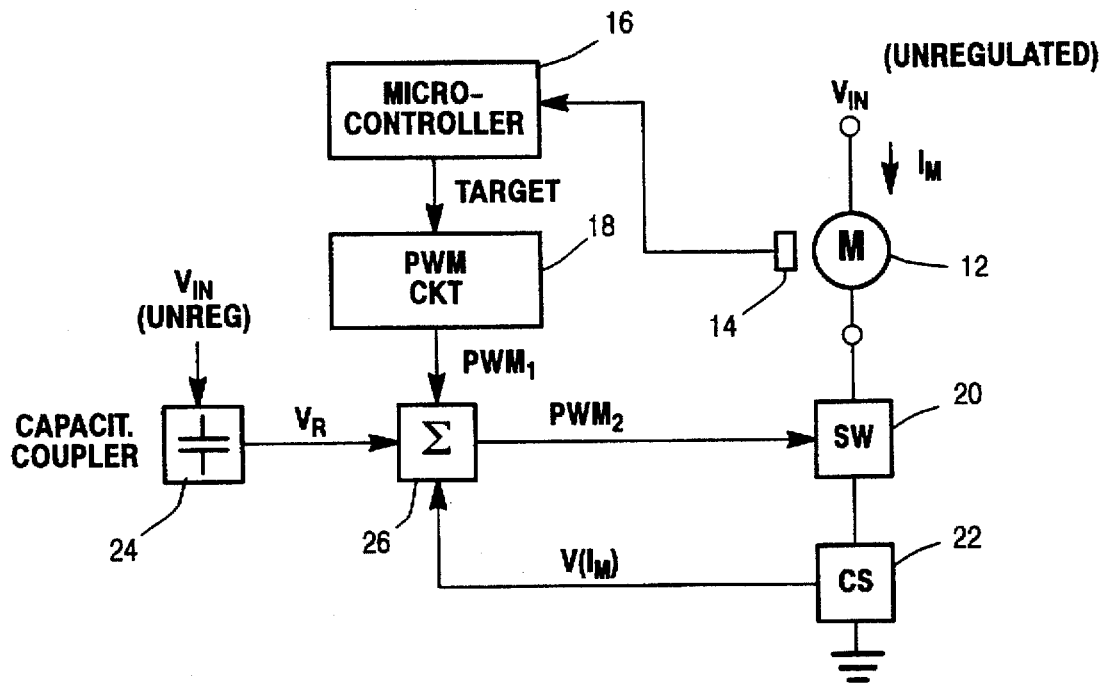
FIG. 2 schematically depicts one presently preferred embodiment of a motor control system in accordance with the present invention.
Figure 3:
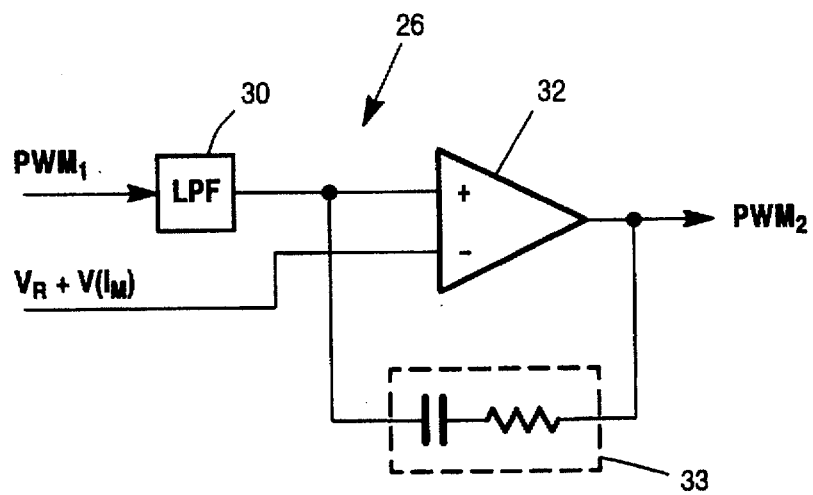
FIG. 3 depicts details of the summing circuit 26 employed by the system of FIG. 2.

FIGS. 2 and 3 schematically depict one presently preferred embodiment of the invention. As shown, this embodiment omits the voltage regulator 10 of the system of FIG. 1, but it does include the motor 12, microcontroller 16, PWM circuit 18, switching device 20, and current sensing unit 22. In addition, the inventive system depicted in FIG. 2 includes a low pass filter (LPF) and a summing circuit 26 arranged as shown. The capacitive coupler 24 provides an AC ripple voltage $V_R$ (i.e., the AC component of the unregulated input voltage $V_{IN}$), which is employed by the summing circuit 26, in combination with the voltage $V(I_M)$, to generate a second modulating signal $PWM_2$. The second modulating signal $PWM_2$ is employed to modulate the motor current $I_M$ by actuating the switching unit 20.

Referring to FIG. 3, a presently preferred embodiment of the invention employs a summing circuit 26 comprising a low pass filter 30 and a comparator 32. The low pass filter 30 converts the first modulating signal $PWM_1$ to a reference voltage, and this reference voltage is input to a first input terminal of the comparator 32. A feedback signal is also provided, via a feedback path 33, to the first input terminal of the comparator 32. The sum of the ripple voltage $V_R$ and the voltage signal $V(I_M)$ is input to the other input terminal of the comparator 32. The output of the comparator is a binary, pulse width modulated signal $PWM_1$, which is used as described above to modulate the motor current. The means for forming the sum of $V_R$ and $V(I_M)$ may include, for example, a pair of suitable resistors connected to form the necessary sum.

Figure 4:
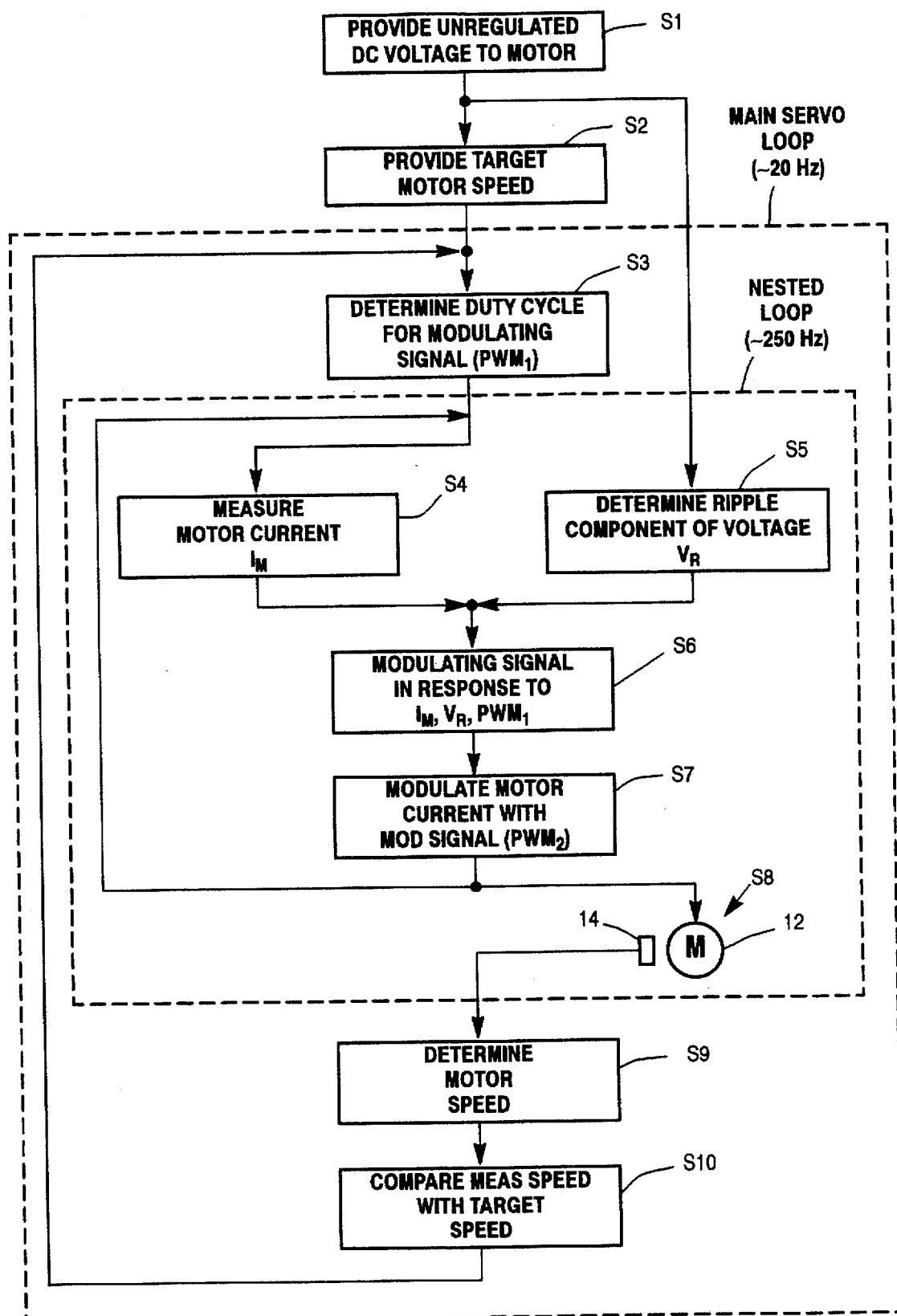
FIG. 4 is a flowchart of a method for controlling the speed of a motor in accordance with the present invention.

FIG. 4 is a flow chart illustrating another aspect of the invention. As shown, a first step S1 of the present invention is to provide an unregulated DC voltage to the motor.

The next step S2 is to provide a target motor speed. A main servo loop comprising steps S3 through S10 is then performed.

Step S3 determines a duty cycle for the modulating signal $PWM_1$. A nested loop comprising steps S4 through S8 is then performed.

Step S4 measures the motor current $I_M$ and step S5 determines the ripple component of the supply voltage.

In step S6, the first modulating signal $PWM_1$ is employed along with the motor current $I_M$ and ripple voltage $V_R$ to generate the second modulating signal $PWM_2$.

In step S7, the motor current is modulated with the second modulation signal $PWM_2$.

In step S8, the system checks the Hall count (i.e., the accumulated Hall transitions) and at the same time loops back to step S4 as shown, to continue the nested loop, while in step S9 the motor speed is determined on the basis of the Hall count.

In step S10, the measured speed is compared with the target speed to determine whether the measured speed is within predefined limits. The method then loops back to step S3 to recompute the duty cycle and adjust the motor speed, if necessary.

Those skilled in the art will readily appreciate that the preferred embodiments disclosed herein may be modified in many ways, and that such modifications will perform the same functions and achieve the same results as described herein. For example, it is not absolutely necessary, although it is preferred, that the first and/or second modulating signals be PWM signals, or even that they be digital signals. It is also not necessary that the motor current be modulated by a switching device as disclosed in FIGS. 1 and 2. Other modifications will become apparent in view of this disclosure and the following claims.

I claim:

1. A system for use in writing/reading to/from a computer readable storage medium, wherein said system controls the speed of a DC capstan motor, comprising said DC capstan motor and:

(a) an unregulated voltage supply, said voltage supply providing a motor current $(I_M)$ and supply voltage $(V_{IN})$ having a substantially constant DC component and a ripple component;

(b) means for obtaining a ripple signal $(V_R)$ representative of said ripple component of the supply voltage; and (c) means for modulating the motor current $(I_M)$ in response to at least said ripple signal to maintain the speed of the motor at a prescribed target speed, whereby said system for use in writing/reading to/from a computer readable storage medium operates without a voltage regulator.

2. A system as recited in claim 1, further comprising a controller providing a first modulating signal $(PWM_1)$ for modulating said motor current to maintain said target speed, wherein said means for modulating the motor current adjusts $PWM_1$ to obtain a second modulating signal $(PWM_2)$ for use in modulating said motor current.

3. A system as recited in claim 2, wherein said ripple component has a predeterminable bandwidth, and wherein said second modulating signal $PWM_2$ is adjusted at a frequency greater than the expected maximum frequency of said ripple component.

4. A method for use in writing/reading to/from a computer readable storage medium, wherein said method controls the speed of a DC capstan motor driven by an unregulated voltage supply, comprising the steps of:

(a) providing a motor current $(I_M)$ and a supply voltage $(V_{IN})$ having a substantially constant DC component and a ripple component by means of said voltage supply;

(b) obtaining a ripple signal $(V_R)$ representative of said ripple component of the supply voltage; and (c) modulating the motor current $(I_M)$ in response to at least said ripple signal to maintain the speed of the motor at a prescribed target speed, whereby said computer readable storage medium operates without a voltage regulator.

5. A method as recited in claim 4, further comprising providing a first modulating signal ($PWM_1$) for modulating said motor current to maintain said target speed, wherein said step of modulating the motor current comprises employing $PWM_1$ to obtain a second modulating signal ($PWM_2$) for use in modulating said motor current.

6. A method as recited in claim 5, wherein said ripple component has a predeterminable bandwidth, and wherein said second modulating signal $PWM_2$ is adjusted at a frequency greater than the expected maximum frequency of said ripple component.

7. A method for controlling the speed of a motor of a tape or disk drive, said motor being driven by an unregulated voltage supply, said voltage supply providing a motor current ($I_M$) and supply voltage ($V_{IN}$) having a substantially constant DC component and a ripple component, comprising the steps of:

(a) determining a target motor speed and modulating said motor current to maintain said target speed, wherein, in a main servo loop performed at a first frequency, said motor speed is checked and said motor current is adjusted if necessary; and (b) measuring said motor current and the ripple component, and adjusting the modulation of said motor current in response to said motor current and ripple component to maintain said target motor speed such that said tape or disk drive operates without a voltage regulator, wherein step (b) is performed in a nested loop at a second frequency greater than said first frequency.

8. A method as recited in claim 7, wherein said second frequency is greater than approximately 200 Hz.

9. A method as recited in claim 7, wherein said second frequency is at least 10 times larger than said first frequency.

10. A method as recited in claim 7, wherein said second frequency is at least twice the expected bandwidth of the ripple component.

11. A method as recited in claim 7, wherein the cost of performing said nested loop is less than the cost of increasing the speed of said main servo loop to account for said ripple component and maintain said target speed.

* * * * *

UNITED STATES PATENT AND TRADEMARK OFFICE
CERTIFICATE OF CORRECTION

PATENT NO. : 5,729,652
DATED : March 17, 1998
INVENTOR(S) : Kirk D. Hanson

It is certified that error appears in the above-indentified patent and that said Letters Patent is hereby corrected as shown below:

Column 3, Line 51, "$PWM_1$" should be --$PWM_2$--.

Signed and Sealed this

Twenty-first Day of July, 1998

Attest:

BRUCE LEHMAN

Attesting Officer

Commissioner of Patents and Trademarks